(12) United States Patent
Bauer

(10) Patent No.: US 9,231,396 B2
(45) Date of Patent: Jan. 5, 2016

(54) SUPPLY LINE RESERVOIR

(75) Inventor: Klaus Bauer, Heimweiler (DE)

(73) Assignee: KHS GmbH, Dortmund (DE)

( * ) Notice: Subject to any disclaimer, the term of this patent is extended or adjusted under 35 U.S.C. 154(b) by 594 days.

(21) Appl. No.: 12/937,905

(22) PCT Filed: Apr. 3, 2009

(86) PCT No.: PCT/EP2009/002491
§ 371 (c)(1),
(2), (4) Date: Oct. 14, 2010

(87) PCT Pub. No.: WO2009/143928
PCT Pub. Date: Dec. 3, 2009

(65) Prior Publication Data
US 2011/0030813 A1 Feb. 10, 2011

(30) Foreign Application Priority Data
Apr. 16, 2008 (DE) .......................... 10 2008 019 334

(51) Int. Cl.
*H05K 5/00* (2006.01)
*H02G 11/00* (2006.01)

(52) U.S. Cl.
CPC ........... *H02G 11/00* (2013.01); *Y10T 137/7039* (2015.04)

(58) Field of Classification Search
CPC ... H02G 11/00; H02G 11/006; H02G 11/003; H02G 11/02; H01B 7/041; F16G 13/16; H05K 5/0247; H05K 7/1411; H05K 7/1489; H05K 7/1491

USPC ........... 174/50, 520, 542, 662, 535; 439/535; 248/906; 361/600, 679.37, 679.39, 361/724–727, 733, 826; 220/4.02
See application file for complete search history.

(56) References Cited

U.S. PATENT DOCUMENTS

| 1,994,898 | A | * | 3/1935 | Ross et al. ..................... 362/375 |
| 2,857,558 | A | * | 10/1958 | Fiske ........................... 361/727 |
| 4,316,238 | A | * | 2/1982 | Booty et al. ................... 362/147 |
| 5,344,084 | A | * | 9/1994 | Andrews et al. .............. 239/751 |
| 5,556,195 | A | * | 9/1996 | Glebe ........................... 362/386 |
| 6,253,663 | B1 | * | 7/2001 | Spencer ......................... 99/279 |
| 6,501,020 | B2 | * | 12/2002 | Grant et al. .................... 174/50 |
| 6,741,459 | B2 | * | 5/2004 | Imamura .................. 361/679.58 |
| 6,896,344 | B2 | * | 5/2005 | Tsutsumi et al. .......... 312/330.1 |

(Continued)

FOREIGN PATENT DOCUMENTS

DE 9105764 8/1991
DE 298 23 108 7/1999

(Continued)

*Primary Examiner* — Lisa Lea Edmonds
*Assistant Examiner* — Christopher L Augustin
(74) *Attorney, Agent, or Firm* — Occhiuti & Rohlicek LLP

(57) ABSTRACT

A supply line reservoir in an appliance housing for connecting lines that enter the housing and connect to insertable and removable appliances that are accommodated within includes a spare length of the connecting line. This spare length is fixed within said housing in such a way that an-appliance can be taken out of the housing while maintaining a connection of the line. The spare length of connecting line is guided within said housing when the appliance is in said housing, and released from the housing when the appliance is taken out of said housing.

22 Claims, 3 Drawing Sheets

(56) References Cited

U.S. PATENT DOCUMENTS

| | | | |
|---|---|---|---|
| 6,902,661 B2* | 6/2005 | Thomas et al. | 205/776.5 |
| 7,164,081 B1* | 1/2007 | Tollefson | 174/50 |
| 7,654,398 B2* | 2/2010 | Bridges et al. | 211/26 |
| 2005/0035868 A1* | 2/2005 | Back et al. | 340/627 |
| 2005/0116079 A1* | 6/2005 | Stevens | 242/419.5 |
| 2007/0202734 A1* | 8/2007 | Fugger et al. | 439/369 |
| 2009/0301380 A1* | 12/2009 | Wahler | 116/62.1 |

FOREIGN PATENT DOCUMENTS

| | | |
|---|---|---|
| DE | 202005007655 | 8/2005 |
| DE | 10 2004 017830 | 11/2005 |
| DE | 20 2006 008840 | 8/2006 |
| DE | 202006006183 | 8/2007 |
| JP | 04 187120 | 7/1992 |
| WO | 2007/122070 | 11/2007 |

\* cited by examiner

SUPPLY LINE RESERVOIR

CROSS-REFERENCE TO RELATED APPLICATIONS

Under 35 USC 371, this application is the National Stage of International Application No. PCT/EP2009/002491, filed on Apr. 3, 2009, which claims the benefit of German Application Serial No. 10 2008 019 334.8, filed on Apr. 16, 2008. The contents of both of the foregoing applications are hereby incorporated by reference in their entirety.

FIELD OF DISCLOSURE

The invention relates to a supply line reservoir in an appliance housing for connecting lines of insertable and removable appliances that are accommodated in a housing.

BACKGROUND

In the construction of installations, it is necessary to provide a large number of appliances in the individual parts of the installation with supply lines. These supply lines can be electrical lines, hydraulic lines, air-pressure feeds, data lines and any other kind of connection or supply line that is needed for operating the appliance in the installation.

Furthermore, it is necessary to occasionally insert and remove an appliance of this kind. Such occasions may arise, for example, when servicing an appliance, or when replacing a defective appliance. Under these circumstances, the appliance to be removed may be in a fairly inaccessible location within the installation. This can make the removal of such an appliance complicated.

An additional problem that arises is that the connecting or supply lines are relatively short in the region of the insertion or removal apertures. As a result, before the appliance can be taken out or re-inserted, these lines have to be attached or detached while still at the location at which the appliance is being operated. This can be difficult because one may have to work in cramped quarters.

In order to solve this problem, it is known to provide spare lengths of line in the region of the appliance and of the insertion aperture. By this means, the appliance can be taken out without having to immediately disconnect the line. In the case of simple servicing operations, these lines can even remain on the appliance under certain circumstances. By avoiding the need to attach and detach supply lines, one can considerably shorten the servicing time. Even when a supply line has to be detached from the removed appliance and connected again after the repair, having a spare length makes this part of the servicing operations considerably easier.

In practice, however, it has turned out that during installation, it is quite common for installers not to provide spare lengths of line. A natural tendency among installers appears to be to pull the line taut when it is laid. This results in either a non-existent spare length of line or one that is too short to be useful. Depending upon the way in which the appliance is designed, moreover, it is difficult to guide the spare lines without their becoming twisted. In some cases, the spare length may even impair operation of the appliance.

SUMMARY

An object of the invention is to make it difficult to avoid providing an adequately long spare length of line and, at the same time, to ensure a clean cable run of the spare length of line.

A surprisingly simple solution to the foregoing problems is that of providing a fixing arrangement for the line strand within an appliance's housing. The fixing arrangement is constructed in such a way that the appliance to be removed can be taken out while maintaining the connection of the line. This reliably suppresses the natural tendency to pull the line too taut when the appliance is being fitted or the lines are being laid. As a result, the spare length of line is less likely to be too short, or to deviate from a desired spare length of line that is needed to take the appliance out.

In addition, the fixing arrangement achieves cable guidance by ensuring that the line does not lie slack in the appliance's housing when the appliance is in the inserted position, but instead extends in a desired, guided manner when the has been inserted. This makes it possible to easily take the appliance out of the insertion housing.

The invention thus makes servicing of the installations considerably easier. It does so by dispensing with the time-consuming and expensive dismantling of the connecting lines while still in the insertion housing or else at the other end of the connecting line. Additionally, the spare length can be long enough so that many simple servicing operations can be carried out without removing the connecting line at all.

In some embodiments, it is advantageous for the fixing arrangement to be at the beginning of an insertion space.

For example, a point at the upper end of the housing or in the region of the aperture used to pass the appliance in and out of the housing is a favorable place for locating the fixing arrangement because it ensures that there will be a sufficient spare length of line to safely take the appliance in or out of the housing.

In other embodiments, the fixing arrangement is a fastening element. An example of a fastening element is an eyelet. Having a fastening element of this kind makes it easy to fasten one or more lines or whole line strands depending upon the configuration. The lines can be fastened easily and held fast in a secure manner so that, even during the subsequent assembly of the installation as a whole, it is not possible for the spare length of line to be shortened, for the cables to become twisted together, or the like.

In some embodiments, the fixing arrangement includes a cable-tensioner. Among these embodiments are those in which the cable-tensioner includes an element that is capable of receiving one or more turns of cable. This enables it to provide an increased spare length of line. Also among these embodiments are those in which the cable-tensioner includes an elastic element that keeps one or more turns of cable under tension and thus prevents or suppresses twisting or the like. In some embodiments, a suitable pull on the cable causes the cable-tensioner to release a certain length of line. This can take place, for example, when the appliance is taken out of its housing. If the appliance is put back into the housing, the cable-tensioner tensions the cable again, thus ensuring torsion-free storage of the entire spare length of line.

Among the embodiments that have a cable-tensioner are those in which the cable-tensioner is arranged in the region of the appliance, or else even on the appliance itself. A particular advantage of locating the cable-tensioner this way is that it tends to ensure that a sufficient quantity of cable is available on the appliance.

Embodiments include those in which the supply lines are hydraulic lines.

Yet other embodiments are those that include motors, those that include sensors, those that include measuring instruments, and those that include any combination of the foregoing features.

In one aspect, the invention features a supply line reservoir in an appliance housing for a connecting line that enters the housing and connects to an insertable-and-removable appliance that is accommodated in the appliance housing. The connecting line has a first length and a second length, the latter being a spare length included within the supply line reservoir and fixed within the housing at a first location at a wall of the housing in such a way that enough slack remains for the appliance to be taken out of the housing while maintaining a connection of the connecting line to the appliance. The supply line enters the housing at a second location that differs from the first location. The supply line's first length extends between the first and second locations, and its second length extends between the first location and the appliance. The spare length of the connecting line is an integral part of the connecting line such that the connecting line is one continuous connecting line that extends from outside the housing to the appliance, to which it directly connects. When the appliance is in the housing, the spare length is guided within the housing. When the appliance is taken out of the housing, the spare length is outside the housing.

In some embodiments, the housing includes a removal aperture and walls that define an inner three-dimensional volume that surrounds the appliance on all sides thereof. The removal aperture is a two-dimensional aperture that is disposed to be opposite one of the walls. The housing has a depth that extends from the removal aperture to one of the walls. The appliance is removed from the housing by being passed through the removal aperture. The spare length of the connecting line is fixed to the appliance housing in a region of the removal aperture, and passes through the removal aperture when the appliance is removed from the housing.

In some embodiments, the spare length of the connecting line is fixed in the appliance housing by a stationary fastening element. Among these are embodiments in which the fastening element includes an eyelet that is fixed to a wall of the housing. This eyelet is directly fastened to the wall of the housing and includes a ring that protrudes into the housing. The ring defines a hole through which the connecting line passes.

In other embodiments, the spare length of the connecting line is fixed in the appliance housing by a cable-tensioner that selectively applies tension to the connecting line and releases tension from the connecting line. Among these are embodiments in which the cable-tensioner is arranged in a region of the appliance. Also among these embodiments are those in which the cable tensioner includes an elastic element that keeps one or more turns of the line under tension and prevents twisting thereof, and those in which the cable tensioner is configured to release a length of the line in response to pulling on the line. Also among these embodiments are those in which the cable-tensioner is arranged on the appliance.

In yet other embodiments, the first length and the second length are disposed such that pulling on the first section with a first force causes a second force in the second section. The first force is directed toward the second location and away from the first location, and the second force is directed away from the second location and toward the first location.

Embodiments also include those in which the connecting line includes a hydraulic line, those in which it includes an electrical line, those in which it includes a data line, and those in which it includes a supply line.

Yet other embodiments include those in which the appliance comprises a measuring instrument, those in which the appliance comprises a motor, and those in which the appliance comprises a sensor.

In other embodiments, following entry into the housing, the supply line follows a path that has a first section and a second section that meet at a wall of the housing In another aspect, the invention features an apparatus for ensuring that sufficient slack in a connecting line remains after installation to enable an appliance to be removed from a housing. Such an apparatus includes an appliance, a housing, and a connecting line. The appliance is accommodated within the housing and removable from the housing through a two-dimensional removal aperture of the housing. The connecting line has a first end that is connected to the appliance and a second end that is connected to a point outside of the housing and is directly connected to the appliance. It passes through the housing at a first location. At a second point that differs from the first point, the connecting line is attached, at an attachment point, to the housing. The first length of the connecting line extends from the attachment point to a point outside the housing, and a second length of the connecting line extends from the attachment point to the appliance. The length defines a spare length of the connecting line for providing slack. The apparatus transitions between a first state and a second state. In the first state, the appliance is inside the housing, the spare length is inside the housing, and the appliance is connected to the connecting line. In the second state, the appliance is outside the housing, the spare length is outside the housing, and the appliance is connected to the connecting line.

Embodiments include those that also have a fastening element fixed to a wall of the housing. This fastening element fixes the line to a point of the wall. In some of these embodiments, the fastening element includes an eyelet that has a ring that defines a hole through which the line passes. This hole defines a plane having a normal vector that has a component parallel to the wall at the point.

In further embodiments, the first section extends along a first path section, and the second section extends along a second path section. A distance between the wall and the first path section varies along the first path section. Similarly, a distance between the wall and the second path section varies along the second path section. A distance between the wall and the first path section and a distance between the wall and the second path section are at a minimum when the first path section and the second path section meet at the housing.

BRIEF DESCRIPTION OF THE DRAWINGS

These and other features of the invention will be apparent from the following detailed description and the accompanying figures, in which.

DETAILED DESCRIPTION

Figure 1:
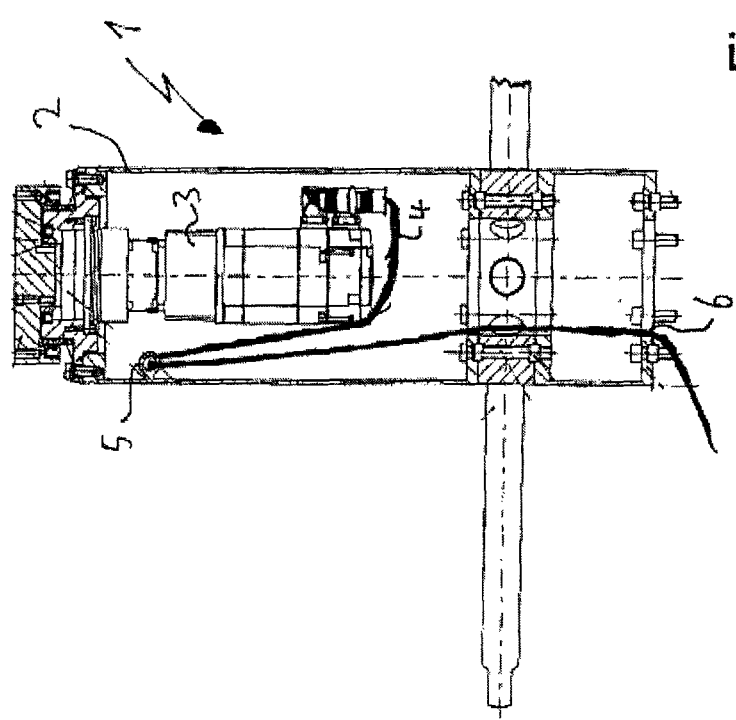
FIG. 1 shows a first configuration of the invention in a cut-away side view and in the inserted state.

FIG. 1 shows a supply line reservoir 1 arranged in an appliance housing 2. Located in the housing 2 is an electrical servo-drive 3, whose connecting line 4 is guided via a fastening eyelet 5 in the top region of the interior of the housing. The connecting line 4 continues and eventually passes out of the housing 2 through the line aperture 6 in the bottom region thereof. This allows it to be connected, together with the other pertinent connecting lines to control units.

Figure 2:
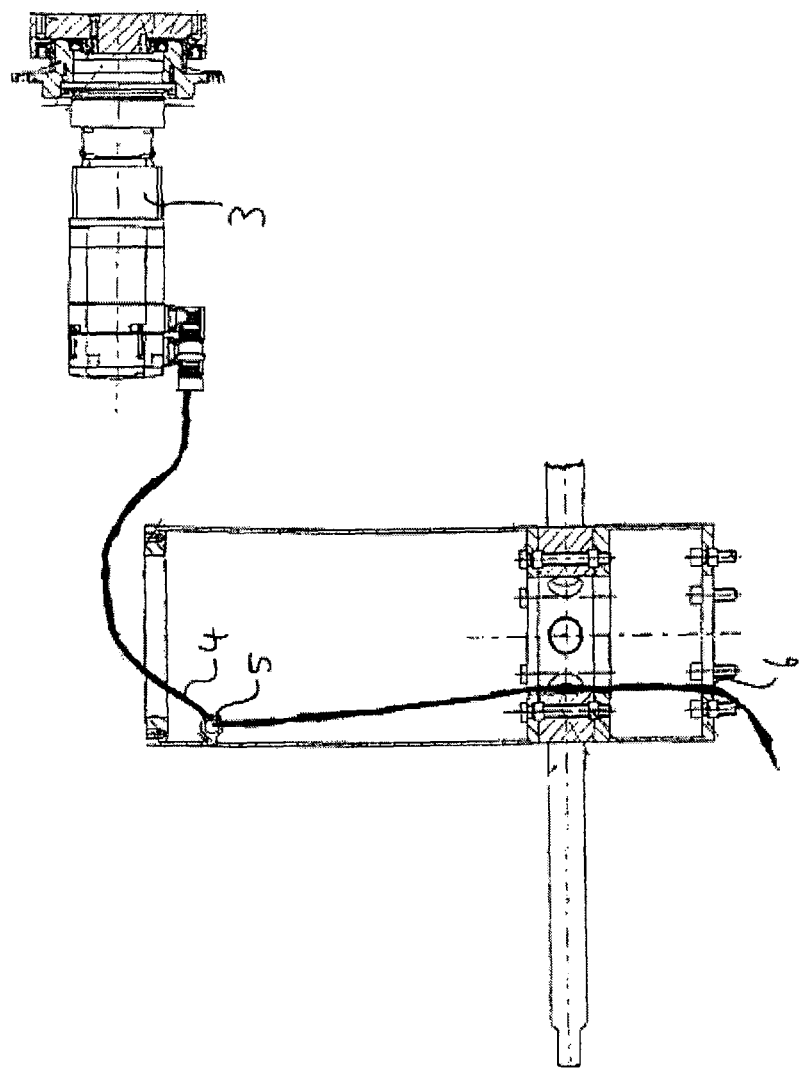
FIG. 2 shows the configuration according to FIG. 1 in the removed state.
Figure 3:
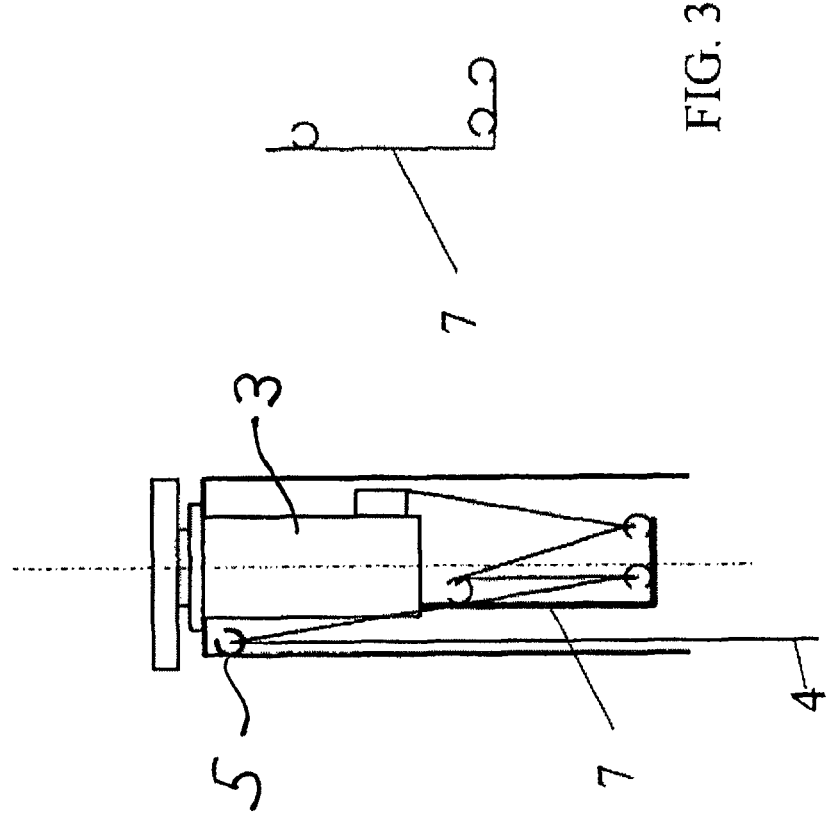
FIG. 3. shows a further exemplified embodiment with a cable-tensioner.

As shown in FIG. 2, the servo-motor 3 can be taken out of the housing in the upward direction. Because the connecting line 4 is guided through the eyelet 5 and only then through the cable aperture 6 in the bottom region of the housing, a sufficient spare length of the line 4 is available in the interior of the housing 2 to enable the drive 3 to be taken out of the housing 2 without the connecting line 4 having to be disconnected. This makes the fitting and detachment of the drive 3 considerably easier since the drive 3 can be disconnected from the line 4 and connected again in a more easily accessible detached state.

Naturally, the invention is not limited to the exemplified embodiment described, but can be modified in a variety of ways without departing from the basic concept.

Thus, the use of a cable-tensioner or other fastening element in the interior of the housing is also possible, in addition to the simple fastening arrangement by means of an eyelet, as represented. All kinds of appliance components and appliances can also be provided with the invention. It is also possible to use all conceivable kinds of lines, supply lines or other feed lines.

The invention claimed is:

1. A supply line reservoir in an appliance housing for a connecting line that enters said housing and connects to an insertable and removable appliance that is accommodated in said appliance housing, wherein said connecting line comprises a first length and a second length, wherein said second length is a spare length, wherein said supply line reservoir comprises said spare length of said connecting line, wherein said spare length is fixed within said housing at a first location at a wall of said housing in such a way that enough slack remains for said appliance to be taken out of said housing while maintaining a connection of said connecting line to said appliance, wherein said supply line enters said housing at a second location, and wherein said first location is different from said second location, wherein said first length of said connecting line extends between said first location and said second location, and said second length of said connecting line extends between said first location and said appliance, wherein said spare length of said connecting line is an integral part of said connecting line such that said connecting line is one continuous connecting line that extends from outside said housing to said appliance, wherein said connecting line is directly connected to said appliance, wherein said spare length of said connecting line is guided within said housing when said appliance is in said housing, and wherein said spare length of said connecting line is outside said housing when said appliance is taken out of said housing.

2. The supply line reservoir according to claim 1, wherein said housing comprises a removal aperture, wherein said housing further comprises walls that define an inner three-dimensional volume that surrounds said appliance on all sides thereof, wherein said removal aperture is a two-dimensional aperture that is disposed to be opposite one of said walls, wherein said housing has a depth that extends from said removal aperture to said one of said walls, wherein said appliance is removed from said housing by being passed through said removal aperture, wherein said spare length of said connecting line is fixed to said appliance housing in a region of said removal aperture, and wherein said spare length passes through said removal aperture when said appliance is removed from said housing.

3. The supply line reservoir according to claim 1, wherein said spare length of said connecting line is fixed in said appliance housing by a stationary fastening element.

4. The supply line reservoir according to claim 3, wherein said fastening element comprises an eyelet that is fixed to a wall of said housing, wherein said eyelet is directly fastened to said wall of said housing, wherein said eyelet comprises a ring that protrudes into said housing, said ring defining a hole through which said connecting line passes.

5. The supply line reservoir according to claim 1, wherein said spare length of said connecting line is fixed in said appliance housing by a cable-tensioner that selectively applies tension to said connecting line and releases tension from said connecting line.

6. The supply line reservoir according to claim 5, wherein said cable-tensioner is arranged in a region of said appliance.

7. The supply line reservoir according to claim 5, wherein said cable-tensioner is arranged on said appliance.

8. The supply line reservoir according to claim 1, wherein said connecting lines comprises a hydraulic line.

9. The supply line reservoir of claim 1, wherein said appliance comprises a measuring instrument.

10. The supply line reservoir of claim 1, wherein said connecting line comprises an electrical line.

11. The supply line reservoir of claim 1, wherein said connecting line comprises a supply line.

12. The supply line reservoir of claim 1, wherein said connecting line comprises a data line.

13. The supply line reservoir of claim 1, wherein said appliance comprises a motor.

14. The supply line reservoir of claim 1, wherein said appliance comprises a sensor.

15. The supply line reservoir according to claim 5, wherein said cable tensioner comprises an elastic element that keeps one or more turns of said line under tension and prevents twisting thereof.

16. The supply line reservoir according to claim 5, wherein said cable tensioner is configured to release a length of said line in response to pulling on said line.

17. The supply line reservoir according to claim 1, wherein following entry into said housing, said supply line follows a path that has a first section and a second section, wherein said first section and said second path section meet at a wall of said housing.

18. The supply line reservoir according to claim 17, wherein said first section extends along a first path section, said second section extends along a second path section, wherein a distance between said wall and said first path section varies along said first path section, wherein a distance between said wall and said second path section varies along said second path section, and wherein a distance between said wall and said first path section and a distance between said wall and said second path section are at a minimum when said first path section and said second path section meet at said housing.

19. The apparatus of claim 17, wherein said first length and said second length are disposed such that pulling on said first section with a first force causes a second force in said second section, wherein said first force is directed toward said second location and away from said first location, and wherein said second force is directed away from said second location and toward said first location.

20. An apparatus for ensuring that sufficient slack in a connecting line remains after installation to enable an appliance to be removed from a housing, said apparatus comprising an appliance, a housing, and a connecting line, wherein said appliance is accommodated within said housing, wherein said appliance is removable from said housing through a two-dimensional removal aperture of said housing, wherein said connecting line has a first end that is connected to said appliance, and a second end that is connected to a point outside of said housing, wherein said connecting line is directly connected to said appliance, wherein said connecting line passes through said housing at a first location, wherein said connecting line is attached, at an attachment point, to said housing, wherein said attachment point is at a second location that differs from said first location, wherein a first length of said connecting line extends from said attachment point to a point outside said housing, wherein a second length of said connecting line extends from said attachment point to said appliance, wherein said second length defines a spare length of said connecting line for providing slack, wherein said apparatus transitions between a first state and a second state, wherein in said first state, said appliance is inside said housing, said spare length is inside said housing, and said appliance is connected to said connecting line, and wherein in said second state, said appliance is outside said housing, said spare length is outside said housing, and said appliance is connected to said connecting line.

21. The apparatus of claim 20, further comprising a fastening element fixed to a wall of said housing, wherein said line is fixed to a point of said wall by said fastening element.

22. The apparatus of claim 21, wherein said fastening element comprises an eyelet, wherein said eyelet comprises a ring that defines a hole through which said line passes, wherein said hole defines a plane having a normal vector, wherein said normal vector has a component parallel to said wall at said point.

* * * * *